(12) United States Patent  
Huang et al.

(10) Patent No.: US 6,675,592 B2  
(45) Date of Patent: Jan. 13, 2004

(54) ELECTRONIC CONTROL STRATEGY FOR A/C COMPRESSOR

(75) Inventors: Yong Huang, Ann Arbor, MI (US); Rodney J. Callahan, Novi, MI (US); Shane A. Harte, Farmington Hills, MI (US); Lawrence William Smith, Fort Wayne, IN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/062,946

(22) Filed: Feb. 2, 2002

(65) Prior Publication Data

US 2003/0145612 A1 Aug. 7, 2003

(51) Int. Cl.⁷ .............................. F25B 49/00; F25B 1/00
(52) U.S. Cl. ...................................... 62/176.6; 62/228.3
(58) Field of Search ............................. 62/176.6, 176.3, 62/228.3, 228.1, 133, 210, 211

(56) References Cited

U.S. PATENT DOCUMENTS

| | | | | |
|---|---|---|---|---|
| 4,602,484 A | * | 7/1986 | Bendikson | 62/158 |
| 4,841,736 A | | 6/1989 | Suzuki | |
| 4,852,363 A | * | 8/1989 | Kampf et al. | 62/176.6 |
| 5,191,768 A | * | 3/1993 | Fujii | 62/209 |
| 5,443,374 A | | 8/1995 | Yoshii et al. | |
| 5,867,996 A | | 2/1999 | Takano et al. | |
| 5,884,497 A | | 3/1999 | Kishita et al. | |
| 6,047,557 A | * | 4/2000 | Pham et al. | 62/228.5 |
| 6,185,947 B1 | * | 2/2001 | Pittion et al. | 62/176.3 |
| 6,189,325 B1 | * | 2/2001 | Pittion et al. | 62/176.3 |
| 6,360,550 B2 | * | 3/2002 | Klapp et al. | 62/94 |
| 6,393,852 B2 | * | 5/2002 | Pham et al. | 62/228.5 |
| 6,449,972 B2 | * | 9/2002 | Pham et al. | 62/228.3 |

FOREIGN PATENT DOCUMENTS

JP    06-87678    3/1991

* cited by examiner

*Primary Examiner*—Marc Norman  
(74) *Attorney, Agent, or Firm*—Brinks Hofer Gilson & Lione (57) ABSTRACT

A method for controlling a vehicle air-conditioning system for cooling an interior of a vehicle is disclosed. The vehicle air conditioning system has a compressor coupled to an electronic control valve. The method includes reading a user manipulatable switch, determining a desired vehicle interior temperature based on the read user manipulatable switch, reading a plurality of sensors indicative of an interior and an exterior climate of the vehicle, determining a heat load on the vehicle air conditioning system, determining a desired evaporator discharge temperature, evaluating a humidity level inside the vehicle by determining a humidity ratio, filtering the updated electronic control valve duty cycle to obtain a new electronic control valve duty cycle based on the desired evaporator discharge temperature, and sending the new electronic control valve duty cycle to a compressor controller, wherein the controller is in communication with the electronic control valve and commands the valve to operate at the new duty cycle.

15 Claims, 5 Drawing Sheets

ELECTRONIC CONTROL STRATEGY FOR A/C COMPRESSOR

TECHNICAL FIELD

The present invention relates to systems and methods for controlling the operation of automotive air conditioning compressors, especially variable displacement compressors which may be regulated for optimal operation for a particular engine operating state and environmental condition.

BACKGROUND

Electronically controlled automotive air conditioning compressors are well known in the prior art. Typically, prior art electronically controlled compressor systems include an electronic control module in communication with various sensors for measuring vehicle interior and exterior environmental conditions, switches for actuating various air conditioning system modes, output ports for relaying output signals to actuate various system components, such as vent doors, blower motor, fans, and valves.

These electronically controlled compressors require a control strategy to optimize system operation. Without a control strategy capable of optimizing the performance of the air conditioning system, there is little justification for electronically controlling the compressor as compared to mechanically controlling the compressor. Generally, electronically controlled compressor systems weigh more, are more expensive, and require more sensors than their mechanical counterpart.

However, with optimum control of the electronically controlled compressor systems, the inefficiencies of mechanically controlled compressors, that are operated at lower evaporator temperatures than otherwise required (typically around 35 F) may be avoided. Such air conditioning systems having mechanically controlled compressors, thus do more work than is required in the vast majority of operating conditions.

Therefore, what is needed is a new and improved method for controlling electronically controlled automotive air conditioning compressors. The new and improved method must not run the compressor unnecessarily. Moreover, it must not create a passenger compartment environment that is prone to fogging or is too humid.

SUMMARY

A method for controlling a vehicle air-conditioning system for cooling an interior of a vehicle is provided. In an aspect of the present invention the vehicle air conditioning system has a compressor coupled to an electronic control valve. In another aspect of the present invention, the method includes reading a user manipulatable switch, determining a desired vehicle interior temperature based on the read user manipulatable switch, reading a plurality of sensors indicative of an interior and an exterior climate of the vehicle, determining a heat load on the vehicle air conditioning system, determining a desired evaporator discharge temperature, evaluating a humidity level inside the vehicle by determining a humidity ratio, filtering the updated electronic control valve duty cycle to obtain a new electronic control valve duty cycle based on the desired evaporator discharge temperature, and sending the new electronic control valve duty cycle to a compressor controller, wherein the controller is in communication with the electronic control valve and commands the valve to operate at the new duty cycle.

DETAILED DESCRIPTION

Figure 1:
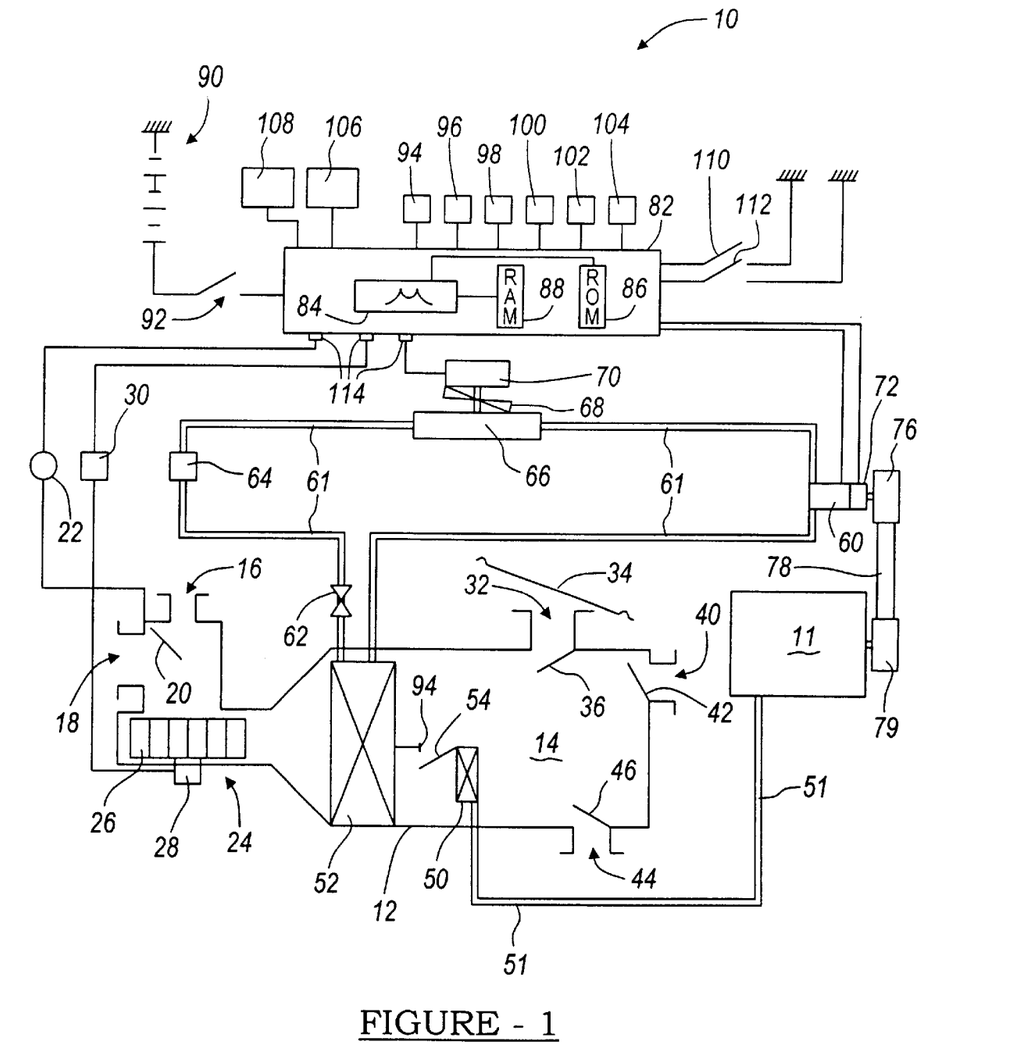
FIG. 1 is a schematic diagram of an air conditioning system for an automobile having a variable displacement compressor, in accordance with the present invention.

Referring now to FIG. 1 an automotive air conditioning or climate control system 10 is schematically represented, in accordance with the present invention. System 10 includes an air conditioning duct which defines an air passage 14 for directing conditioned air into a passenger compartment.

Air conditioning duct 12 includes a plurality of inlets and outlets for drawing in outside air and for directing conditioned air into the passenger compartment. For example, the inlets include an outdoor air inlet 16 for drawing in outside air, and an inside air recirculation inlet 18 for recirculating air contained within the passenger compartment. A mode selector door 20 driven by a small motor 22 is provided to allow a passenger to select between an outside intake mode and an inside air recirculation mode.

Further, a blower 24 such as a centrifugal blower is provided within air conditioning duct 12 for producing air flow from the air inlets to the air outlets. Blower 24 further includes a centrifugal fan 26 and a motor 28. Motor 28 is controlled by a motor driver circuit 30.

Air conditioning duct 12 further includes a plurality of air outlets for directing air conditioned air to various parts of the passenger compartment. More specifically, a defroster outlet 32 is provided for directing conditioned air to a vehicle windshield 34. A defroster mode is selected by actuating a defroster door 36. Further, an upper body air outlet 40 is provided for directing conditioned air toward a vehicle occupant's upper body. An upper body selection mode is selected by actuating an upper body air mode door 42. Similarly, a foot air outlet 44 is provided for directing conditioned air towards the feet of vehicle occupants. Preferably, a foot air mode door 46 is provided for selecting a foot air mode.

With continuing reference to FIG. 1, a heater unit 50 having a heater core is provided for heating cold air passing by an evaporator unit 52. Typically, the heater core is supplied with heated cooling water from the engine 11. During the heating cycle of the air conditioning system, the heater unit 50 acts as a heat exchanger using the heater cooling water to heat the cold air passing through the evaporator 52. An air regulator door 54 is provided for regulating the amount of air heated by the heater unit 50.

Evaporator 52 is in fluid communication with a compressor 60. Compressor 60 is preferably a variable displacement compressor, or a fixed displacement compressor or a mechanically controlled compressor, that draws in refrigerant, compresses the refrigerant and discharges the refrigerant. Evaporator 52 is also in communication with an expansion valve 62. Expansion valve 62 expands the liquid refrigerant fed from a receiver 64. Receiver 64 performs vapor liquid separation of the refrigerant fed from a condenser 66. Condenser 66 condenses and liquefies the refrigerant fed from compressor 60 through heat exchange with outdoor air. Condenser 66 is cooled by a cooling fan 68 which is driven by a driver motor 70.

Compressor 60 further includes an electromagnetic clutch 72 that is in communication with a compressor drive pulley 76 for engaging and disengaging a drive belt 78 driven by engine 11. However, in alternative embodiments of the present invention compressor 60 does not include an electromagnetic clutch and thus is in continuous engagement with engine 11.

An air-conditioning system control unit 82 (ACU) is further provided for controlling the operation of the air conditioning system in accordance with the present invention. Air-conditioning control unit 82 includes a microprocessor 84, read only memory (ROM) 86, and random access memory (RAM) 88 and other conventional computer components. The ACU is supplied power by the vehicle battery 90 when the ignition switch 92 is switched on. A plurality of switches and sensors are in communication with ACU 82 for sending to the ACU electrical signals indicative of air conditioning environmental factors necessary for determining how to optimally air condition the passenger compartment. The sensors include, for example, an indoor air temperature sensor 94 for determining the temperature of the air inside the passenger compartment, an outdoor air temperature sensor 96 for determining the temperature of the outside air, a solar radiation sensor 98 for determining the intensity of the solar radiation incident on the passenger compartment, a post evaporator temperature sensor 100 detects the actual air cooling by the evaporator, a humidity sensor 102 for detecting a relative humidity of air inside the passenger compartment and a rotational speed sensor 104 for detecting rotational speed of engine 11.

The switches for manual control of the air conditioning system 10 include, for example, a temperature setting switch 106 for setting a desired indoor air temperature to a desired temperature level, an indoor/outdoor air selector switch 108 for selecting outdoor air intake mode or indoor air recirculation mode, an air conditioning on/off switch 110 for turning on and off the air conditioning system, and an automatic mode switch 112 for selecting automatic air conditioning operation. Further, control unit 82 has a plurality of output ports 114 for sending control signals to the various air conditioning system components. For example, control signals are sent to the various vent doors, fan motors, and the variable displacement compressor 60.

Figure 2:
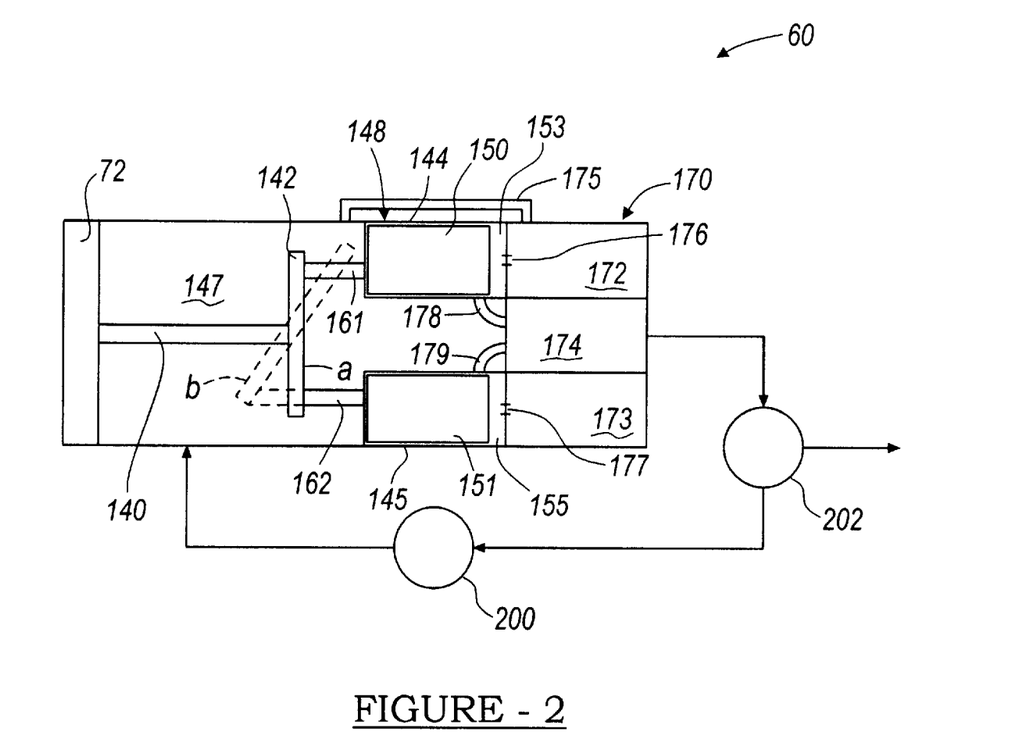
FIG. 2 is a schematic diagram of a variable displacement compressor that is selectively driven by the engine, in accordance with the present invention.

Referring now to FIG. 2, a schematic diagram of variable displacement compressor 60 is shown in greater detail, in accordance with the present invention. Compressor 60 includes a driveshaft 140 that is operatively coupled to an external drive source such as vehicle engine 18 by electromagnetic clutch 72 and to electric motor 20. A swashplate 142 is rotatably secured to shaft 140 and is pivotable about the driveshaft. A pair of guide arms 161 and 162 are attached to swashplate 142 at a first end and to pistons 150 and 151 at a second end. The engagement between guide arms 161, 162 and the associated pistons guides the inclination of the swashplate 142 and rotates the swashplate with respect to the driveshaft 140. Driveshaft 140 and swashplate 142 are positioned within a crankcase chamber 147. The pressure in crankcase chamber 147 controls the angle of inclination of the swashplate.

Generally, compressor 60 further includes a cylinder housing 148 having cylindrical bores 144 and 145 extending therethrough. Each bore 144 and 145 accommodates one piston 150, 151. Each piston and bore define compression chambers 153, 155. Alternatively, each piston may be coupled to the swashplate by a pair of shoes (not shown). Rotation of the swashplate is converted into reciprocation of pistons 150, 151 in bores 144, 145 by means of the shoes, as well known in the art.

Further, compressor 60 includes a rear housing 170 having a suction chamber 172 and 173 and a discharge chamber 174. Suction ports 176 and 177 and discharge ports 178 and 179 are also provided at each chamber. A suction valve (not shown) is provided at each suction port for opening and closing the suction port. A discharge valve (not shown) is provided at each discharge port for opening and closing the discharge port. Further, a bypass port or orifice 175 is provided between crankcase chamber 147 and suction chamber 172.

As each piston 150, 151 moves from a fully extended position to a fully retracted position refrigerant is drawn into the corresponding suction port from the suction chamber to enter the associated compression chamber. Conversely, when each piston moves from a fully retracted position to a fully extended position, the refrigerant is compressed in compression chambers 153, 155 and the discharge valve opens allowing refrigerant to flow into discharge chamber 174 through associated discharge ports 178, 179. The inclination of swashplate 148 varies in accordance with the difference between the pressure in crankcase chamber 147 and the pressure in compression chambers 153, 155. More specifically, the difference between the pressure in crankcase chamber 147 (PC) and the pressure in the suction chambers 172, 173 (PS) or the pressure difference "PC–PS" determines the inclination of the swashplate. PC is maintained at a pressure value that is higher than the suction pressure PS (PC>PS). An increase in the pressure difference PC–PS decreases the inclination of the swashplate. This shortens the stroke of each piston 150, 151 and decreases the displacement of compressor 60. On the other hand, a decrease in pressure difference PC–PS increases the inclination of swashplate 142. This lengthens the stroke of each piston 150, 151 and increases the displacement of compressor 60.

In FIG. 2 swashplate 142 is indicated by solid-lines (a) in a first position (position a). When the swashplate is in position (a) the pistons 150, 151 do not reciprocate within chambers 153, 155. Compressor 60 is at its minimum displacement. As indicated by dashed-lines (b) the swashplate may be disposed in a second position (position b). Position (b) illustrates the maximum angle of inclination the swashplate can achieve. This is also the position in which compressor 60 achieves its maximum displacement. Depending on the pressures in crankcase chamber 147, suction chamber 172 and discharge chamber 174 the swashplate may be inclined at any angle between position (a) and (b) achieving variable displacement.

An electronic control valve 200 is in communication with the discharge chamber 174, through a refrigerant/oil separator 202, and with the crankcase chamber. Electronic control valve 200 regulates the pressure in crankcase chamber 147, suction chamber 172 and discharge chamber 174, by selectively opening and closing communication ports connecting the crankcase chamber to the discharge chamber. A control strategy for actuating valve 200 will be described hereinafter.

The electromagnetic control valve 200 serves to regulate the discharge capacity of compressor 60 by changing a set level of suction pressure of the compressor according to a control current supplied by the air conditioning electronic control unit 82.

In a preferred embodiment of the present invention a control strategy for controlling the operation of electromagnetic control valve 200 is implemented in software, or in hardware or in both software and hardware. For example, control logic for controlling the operation of control valve 200 in one embodiment is stored in the ACU's read only memory 86.

Figure 3:
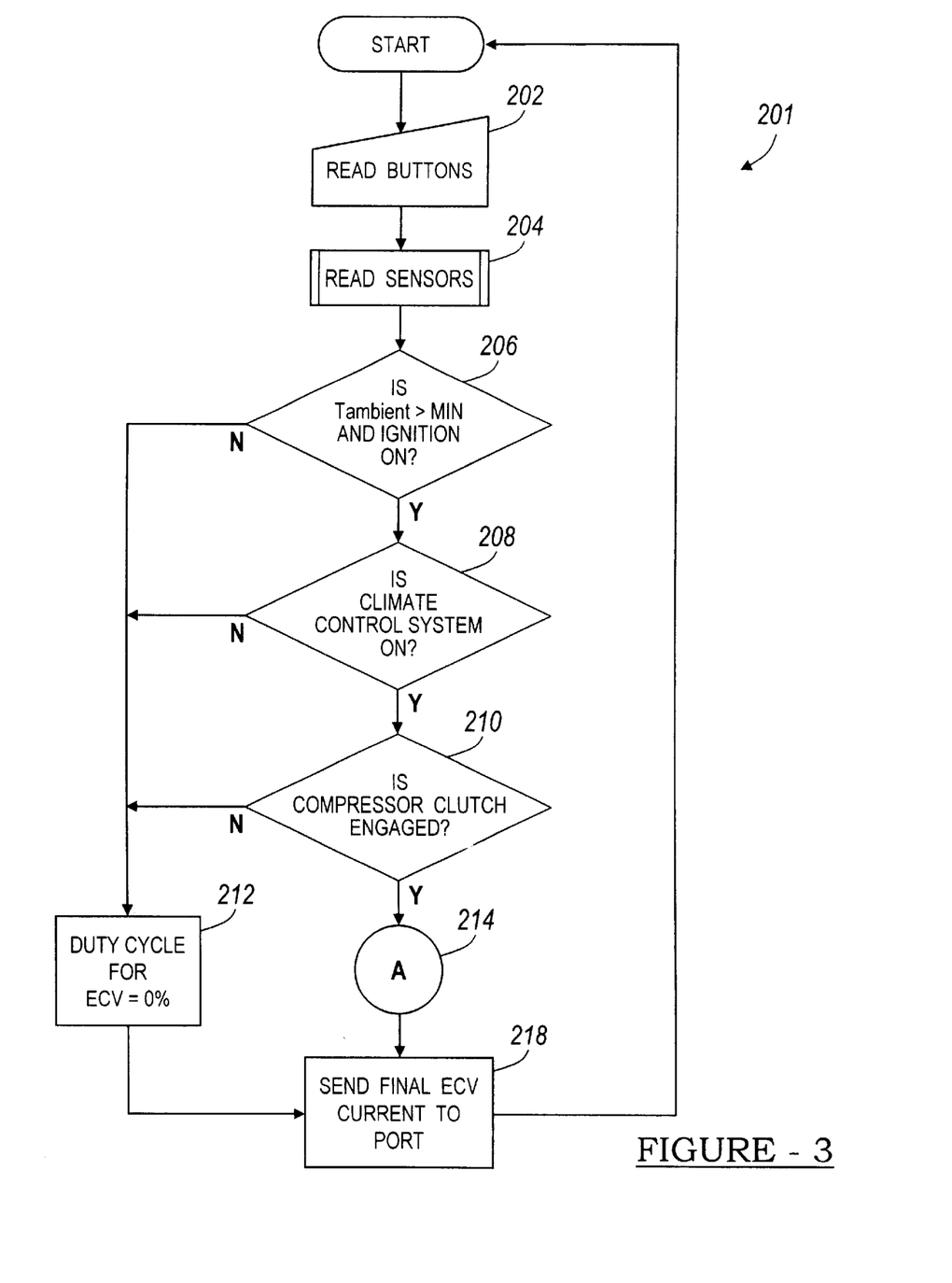
FIGS. 3–5 are a flowcharts illustrating a method for controlling the variable displacement compressor, in accordance with the present invention.

Referring now to FIG. 3, a variable compressor and valve control strategy 201 is illustrated in flow chart form, in accordance with the present invention. The initial step of the control strategy is to determine the load acting on the AC system. The thermal load is determined by analyzing four elements (1) the fresh air and body leakage air intake load, (2) the convection and conduction losses through the body of the car, (3) the solar gain load through the car, and (4) the thermal inertia which must be overcome to bring the interior temperature of the car down to a desired level. The fresh air and body leakage load is calculated as a function of blower speed, the blend door position, the recirculation door position, and the interior and exterior temperatures. The blower speed and flow rate determines how much of the fresh air is being injected into the vehicle. This control strategy is based on the assumption that if the blower is in recirculation mode, then 20% of the flow is outside air and 80% of the flow is inside air. If the mode doors are set for floor/defrost or defrost, then this strategy assumes that the AC system is set in fresh air mode. The fresh air and body leakage load may be described by the following equation:

$$\dot{Q}_{fresh} = \dot{m}_{blower} \cdot K_{door} \cdot C_{air} \cdot (T_{amb} - T_{set})$$

where:

$K_{door} = 0.8_{fresh}$ $\dot{m}$ = mass flow rate of blower $T_{amb}$ = ambient air temperature $T_{set}$ = set temperature The body conductivity losses should be based on actual or simulated test data recorded at 110 F. Body leakage is a function of the inside and outside air temperature difference and the thermal insulation characteristics of the vehicle.

The convection losses through the body of the vehicle are determined first by conducting thermal testing of the vehicle in question to determine the heat absorption rate at a given temperature. Using this data a convection constant ($K_{con}$) is determined, and the following equation describes the convection load:

$$\dot{Q}_{con} = K_{con} \cdot (T_{amb} - T_{set})$$

where:

$$K_{con} = 0.012 + S_{veh} \cdot \frac{\frac{1.0}{110-70} - \frac{0.75}{110-70}}{96-48}$$

$S_{veh}$ = Speed of Vehicle (km/hr)

The sun load is a function of the measurements from a sun load sensor and also particular characteristics of a given vehicle. Again, vehicle testing would be required to determine the amount of energy a vehicle absorbs under full sun load. The sun load may be described by the following equation:

$$\dot{Q}_{sun} = K_{sun} \cdot T_{sun}$$

where:

$K_{sun} = 0.67\ m^2$ $1\ kWm^{-2} \geq T_{sun} \geq 0\ kWm^{-2}$

The remaining load determines the thermal inertia load. This load is a function of the interior temperature and the vehicle occupant's desired interior temperature. Desired interior temperature is determined by reading control switches and buttons, as represented by block 202. In an embodiment of the present invention, the compressor is operated at a maximum capacity until the desired temperature is reached. Preferably, the load is based on the difference between the current interior temperature and the desired temperature. This allows the two temperatures to converge asymptotically and thus avoid overshoot. An acceleration timer can be used to increase the speed of convergence. The thermal inertia load may be described by the following equation:

$$\dot{Q}_{inertia} = K_{acc} \cdot \dot{m}_{blower} \cdot C_{air} \cdot (T_{int} - T_{set})$$

Thus, the total load is calculated by summing the above loads as described by the following equation:

$$\dot{Q}_{tot} = \dot{Q}_{fresh} + \dot{Q}_{con} + \dot{Q}_{sun} + \dot{Q}_{inertia}$$

At block 204, the various system sensors described above are read. Three conditions are checked at blocks 206, 208 and 210. All of these conditions must be met to continue strategy 201. The first condition, represented by block 206 is to determine whether the ambient outside air temperature is greater than a predefined minimum temperature, and whether the vehicle ignition is "on". If the ambient air temperature is greater than the predefined temperature and the ignition is "on", the next condition is checked, at block 208. However, if the ambient temperature is not greater than the predefined minimum temperature and/or the ignition is "off", then control valve 200 is not activated, as represented by block 212. The next condition checked is whether climate control system 10 has been activated, as represented by block 208. If the system is "on", then the third condition is checked, as represented by block 210. If system 10 is not "on", then control valve 200 is not activated, as represented by block 212. At block 210, the strategy determines whether the electromagnetic clutch 72 is engaged. If the clutch is not engaged, then valve 200 is not activated, as represented by block 212. However, if the clutch is engaged then the desired evaporator discharge air temperature is determined, as represented by block 214 and further in FIG. 4.

Figure 4:
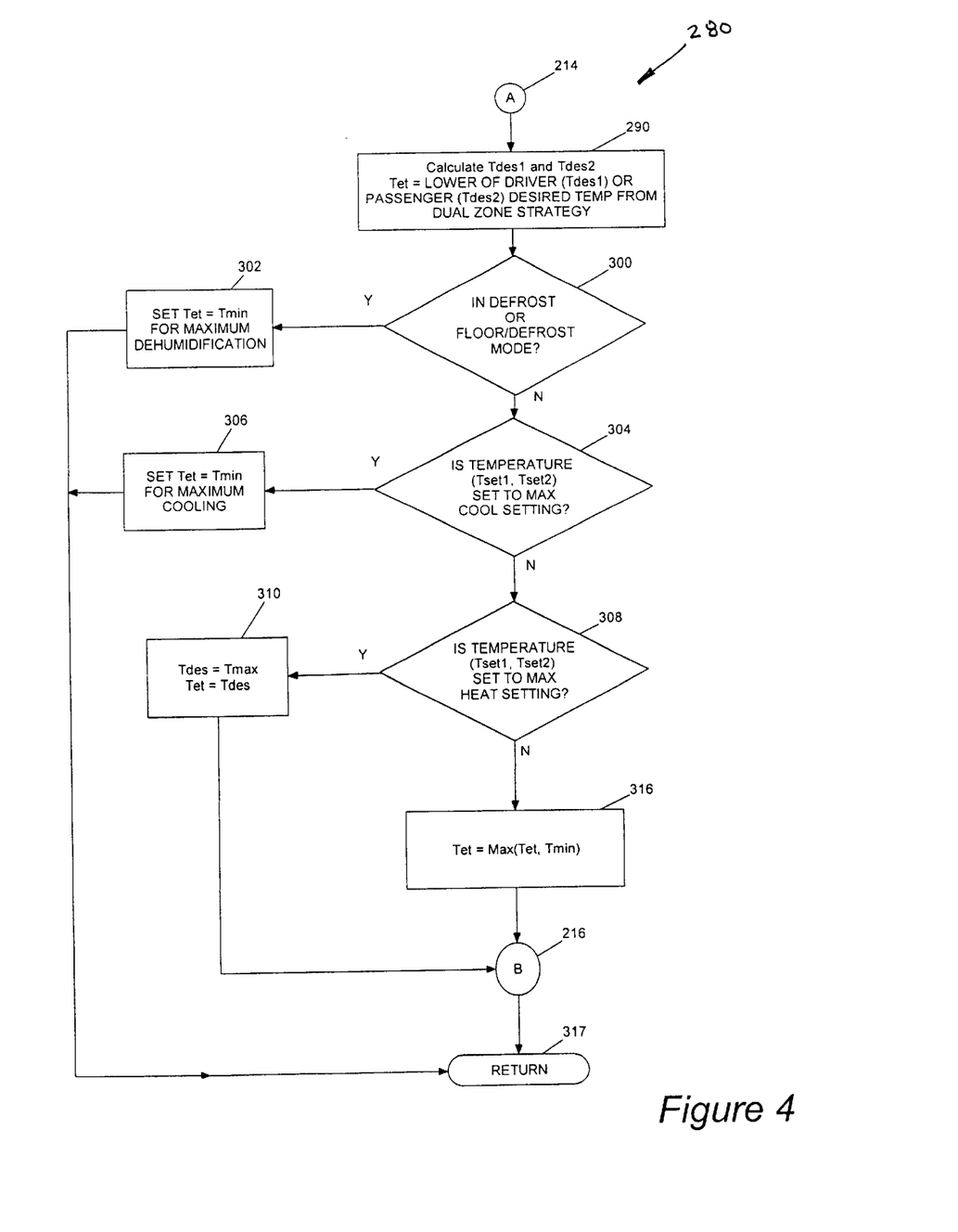

In FIG. 4, a method 280 for determining the desired evaporator discharge air temperature ($T_{et}$) is illustrated, in accordance with the present invention. If climate control system 10 has been requested, the system sets the $T_{et}$ to the lower of the driver ($T_{des1}$) or passenger ($T_{des2}$) desired temperatures in a dual zone system, at block 290. At block 300, the system determines whether defrost or floor/defrost modes are selected. If defrost or floor/defrost modes are activated, then $T_{et}$ is set for maximum dehumidification. However, if defrost or floor/defrost modes are not activated, then the system determines if the temperature is set to maximum cooling mode, as represented by block 304.

If the temperature is set to maximum cooling, then $T_{et}$ is set for maximum cooling, as represented by block 306. However, if temperature is not set to maximum cooling, the system determines whether the temperature is set for maximum heating, as represented by block 308. If the system determines that the temperature is set to maximum heating, then valve 200 is not activated and $T_{et}$ is set equal to $T_{desired}$, where $T_{desired}$ is equal to the maximum system temperature ($T_{max}$), as represented by block 310. However, if the temperature is not set to maximum heating, then the system sets $T_{et}$ to the greater of $T_{et}$ and the minimum temperature ($T_{min}$), as represented by block 316.

Figure 5:
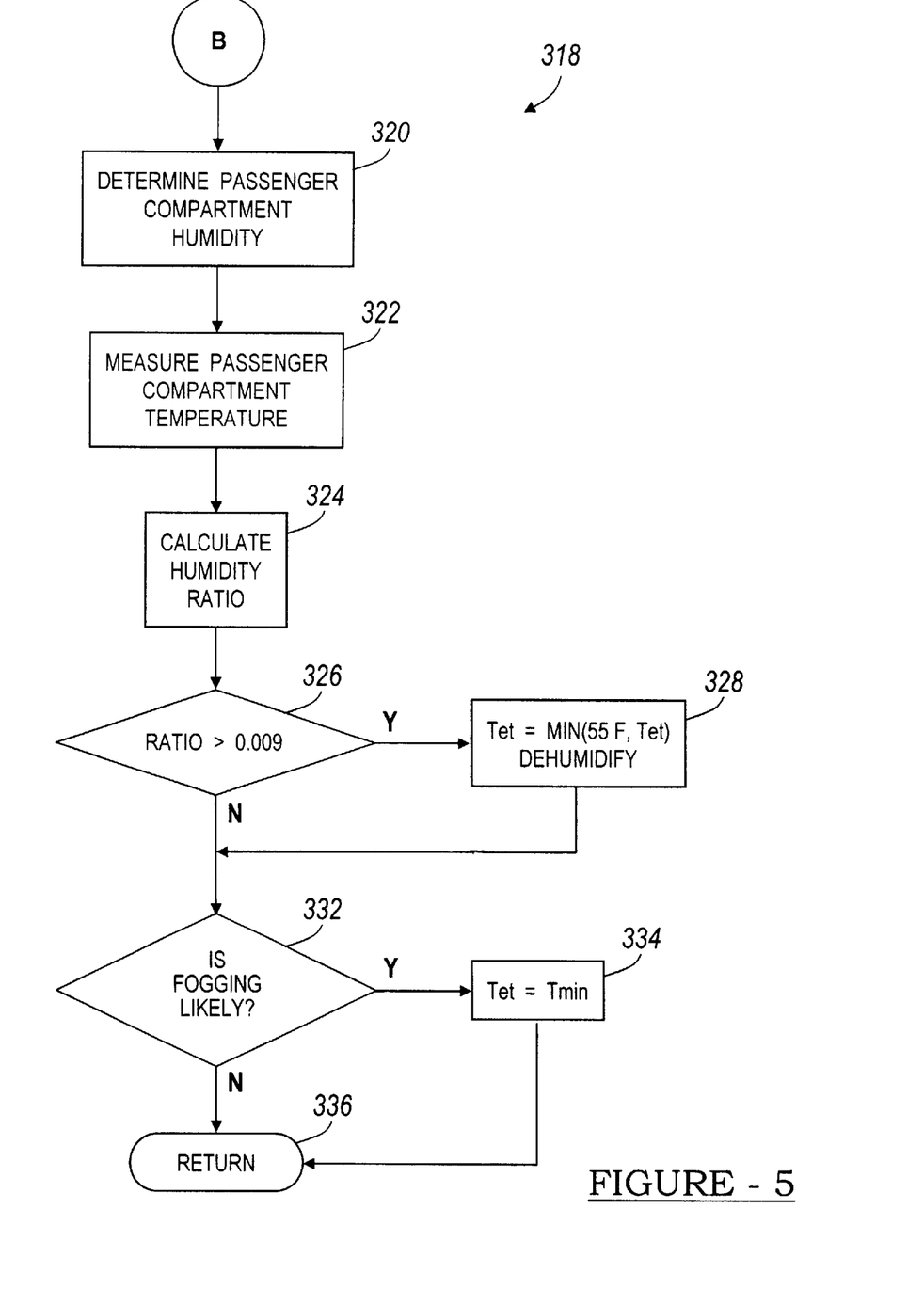

The next step, as indicated by block 216, is to evaluate the humidity level in the vehicle and determine what steps are necessary to prevent fogging. With reference to FIG. 5, a method 318 for evaluating the humidity level in the passenger compartment to prevent fogging is illustrated. This is accomplished by setting a target temperature for air passing through the evaporator and modulating the compressor accordingly to achieve the target temperature. Having calculated the load and knowing the air mass flow rate (ṁ) from previous calculations shown above, $T_{desired}$ and $T_{et}$ may be described by the following equation:

$$T_{desired} = T_{ei} - \frac{\dot{Q}_{tot}}{\dot{m}_{blower} \cdot C_{air}}$$

$T_{et} = T_{desired}$ $T_{ei}$=evaporator inlet temperature

As illustrated in this equation, the evaporator capacity is modulated based on the thermal loading on the system.

At block 320 the humidity level within the passenger compartment is measured by a humidity sensor. If the humidity level is too high, irrespective of the interior or exterior conditions, the air within the passenger compartment must be cooled to remove the humidity from the air. A target evaporator discharge temperature of approximately 55° F. is selected, which falls within the normal comfort level, as defined by ASHRAE. When the air is reheated, the air will fall into a comfortable region. In order to determine if the humidity is too high, a humidity ratio must be evaluated. The humidity ratio is evaluated by referring to table 1 below and by measuring the humidity, using the humidity sensor, and the temperature using the temperature sensor, as represented by blocks 320 and 322. The humidity ratio is then evaluated, as represented by block 324. Preferably, table 1 is stored in system memory. The humidity ratio is compared to a target humidity ratio such as approximately 0.009, as reprsented by block 326. If at a given temperature the relative humidity is greater than the relative humidity shown in the table 1, then the humidity ration is determined to be greater than the target humidity ratio. The air must then be dehumidified, as represented by block 328. Table 1 below shows the temperature versus humidity values for a humidity ratio of 0.009 kg water/kg air.

TABLE 1

Temperature Vs. Relative Humidity at 0.009 Humidity Ratio

| Temperature | Relative Humidity |
|---|---|
| 54 | 100 |
| 57 | 90 |
| 60 | 80 |
| 64 | 70 |
| 69 | 60 |
| 74 | 50 |
| 81 | 40 |
| 90 | 30 |
| 103 | 20 |

If the measured interior air has a humidity ratio above 0.009 kg water/kg air, then the air must be cooled to 55° F. This is due to the fact that the humidity ratio at 55° F. and 100% relative humidity is 0.009 kg water/kg air. The following control logic statement may be used in the control strategy to accomplish this objective:

IF(($T_{et}$)55 F) and (HR)0.009))$T_{et}$=55° F.

Finally, the control strategy determines if fogging is probable, as represented by 332. If fogging is likely, the compressor will be operated to produce the lowest evaporator discharge temperature possible to remove or dilute the moisture in the air, as represented by blocks 332 and 334. The following control logic statement may be used to accomplish this objective:

IF(Fogging Probability=High)$T_{et}$=35° F.

Fogging occurs when the humidity in the vehicle is high enough that water condenses on the interior of the car. The strategy returns to the main program at block 336.

Having decided upon the target evaporator outlet temperature, the strategy returns to FIG. 3. The next step is to determine the output current for the compressor, as represented by block 218. The control current/depends on current control setting for the compressor and the difference between the actual evaporator outlet temperature ($T_{et}$) and the real evaporator temperature ($T_{evapout}$). The following closed loop control logic may be used:

$\Delta T = T_{et} - T_{evapout}$ $$I_{t+1} = I_t + I_{max} \cdot K \cdot \frac{\Delta T}{10}$$

where.

$I_{t+1} \leq I_{max}$ $\Delta T \leq 10$

As any person skilled in the art of electronic control automotive air conditioning compressors will recognize from the previous detailed description and from the figures and claims, modifications and changes can be made to the preferred embodiments of the invention without departing from the scope of this invention defined in the following claims.

What is claimed is:

1. A method for controlling a vehicle air-conditioning system for cooling an interior of a vehicle, wherein the vehicle air conditioning system has a compressor coupled to an electronic control valve, the method comprising:

reading a user manipulateable switch;

determining a desired vehicle interior temperature based on the read user manipulateable switch;

reading a plurality of sensors having output signals indicative of an interior and an exterior climate of the vehicle;

determining a heat load on the vehicle air conditioning system based on the reading of the plurality of sensors having output signals indicative of the interior and the exterior climate of the vehicle;

determining a desired evaporator discharge temperature based on the determined heat load and the determined desired vehicle interior temperature and setting the desired evaporator discharge temperature to the lower of a driver and a passenger desired temperature;

evaluating a humidity level inside the vehicle by reading at least one of the plurality of sensors having at least one output signal indicative of the interior and the exterior climate of the vehicle;

determining a humidity ratio based on the evaluated humidity level;

determining whether fogging will occur inside the vehicle based on the determined humidity ratio; and modifying the desired evaporation temperature if fogging is determined to occur.

2. The method of claim 1 wherein reading a user manipulatable switch further comprises reading a vehicle ignition switch.

3. The method of claim 1 wherein reading a plurality of sensors further comprises reading an inside air temperature sensor.

4. The method of claim 1 wherein determining a desired evaporator discharge temperature further comprises reading a user manipulatable temperature setting switch.

5. The method of claim 1 wherein determining a desired evaporator discharge temperature further comprises determining whether the vehicle air-conditioning system is in a defrost mode.

6. The method of claim 1 wherein determining a desired evaporator discharge temperature further comprises determining whether the vehicle air-conditioning system is set to a maximum cooling mode.

7. The method of claim 1 wherein determining a desired evaporator discharge temperature further comprises determining whether the vehicle air-conditioning system is set to a maximum heating mode.

8. The method of claim 1 wherein evaluating a humidity level further comprises reading a temperature and a relative humid inside the vehicle to evaluate whether a humidity ratio is greater than a target humidity ratio.

9. A method for controlling a vehicle air-conditioning system for cooling or heating an interior of a vehicle, wherein the vehicle air conditioning system has a compressor coupled to an electronic control valve, the method comprising:

reading a user manipulateable switch;

determining a desired vehicle interior temperature based on the read user manipulateable switch;

reading a plurality of sensors having output signals indicative of an interior and an exterior climate of the vehicle;

determining a heat load on the vehicle air conditioning system based on the reading of the plurality of sensors having output signals indicative of the interior and the exterior climate of the vehicle;

determining a desired evaporator discharge temperature based on the determined heat load and the determined desired vehicle interior temperature;

evaluating a humidity level inside the vehicle by reading at least one of the plurality of sensors having at least one output signal indicative of the interior and the exterior climate of the vehicle;

determining a humidity ratio based on the evaluated humidity level;

comparing the humidity ratio to a target humidity ratio wherein the target humidity ratio is approximately 0.009 kg water/kg air;

determining whether fogging will occur inside the vehicle based on the comparison of the humidity ratio to a target humidity ratio; and modifying the desired evaporation temperature if fogging is determined to occur.

10. The method of claim 9 wherein reading a user manipulatable switch further comprises reading a vehicle ignition switch.

11. The method of claim 9 wherein reading a plurality of sensors further comprises reading an inside air temperature sensor.

12. The method of claim 9 wherein determining a desired evaporator discharge temperature further comprises reading a user manipulatable temperature setting switch.

13. The method of claim 9 wherein determining a desired evaporator discharge temperature further comprises determining whether the vehicle air-conditioning system is in a defrost mode.

14. The method of claim 9 wherein determining a desired evaporator discharge temperature further comprises determining whether the vehicle air-conditioning system is set to a maximum cooling mode.

15. The method of claim 9 wherein determining a desired evaporator discharge temperature further comprises determining whether the vehicle air-conditioning system is set to a maximum heating mode.

* * * * *

UNITED STATES PATENT AND TRADEMARK OFFICE
CERTIFICATE OF CORRECTION

PATENT NO.    : 6,675,592 B2
DATED         : January 13, 2004
INVENTOR(S)   : Yong Huang et al.

It is certified that error appears in the above-identified patent and that said Letters Patent is hereby corrected as shown below:

Column 9,
Line 3, delete "humid" and substitute -- humidity -- in its place.

Signed and Sealed this

First Day of June, 2004

JON W. DUDAS
*Acting Director of the United States Patent and Trademark Office*